No. 726,754. PATENTED APR. 28, 1903.
G. E. PRINCE.
MACHINE FOR RECORDING MUSIC.
APPLICATION FILED OCT. 9, 1902.
NO MODEL. 6 SHEETS—SHEET 1.

FIG. 1.

No. 726,754. PATENTED APR. 28, 1903.
G. E. PRINCE.
MACHINE FOR RECORDING MUSIC.
APPLICATION FILED OCT. 9, 1902.
NO MODEL. 6 SHEETS—SHEET 3.

UNITED STATES PATENT OFFICE.

GEORGE EDE PRINCE, OF NORTHWOOD, ENGLAND.

MACHINE FOR RECORDING MUSIC.

SPECIFICATION forming part of Letters Patent No. 726,754, dated April 28, 1903.

Application filed October 9, 1902. Serial No. 126,417. (No model.)

*To all whom it may concern:*

Be it known that I, GEORGE EDE PRINCE, a subject of the King of Great Britain, and a resident of Northwood, in the county of Middlesex, England, have invented certain new and useful Improvements in Machines for Recording Music, (for which I have made application for patent in Great Britain under No. 7,045, dated March 22, 1902,) of which the following is a specification.

This invention relates to a machine for recording music, consisting of a novel combination of coacting groups of mechanism, the end to be attained being to obtain a printed record of the notes produced or a transposition of the notes produced by playing musical instruments having keyboards; and this invention particularly relates to the production of records in which the proper distinctive characters are directly printed according to the duration of the notes played instead of, as has been common, registering the notes by perforations or more or less prolonged horizontal markings. In mechanism of this character it has been heretofore proposed to employ a member having a continuous reciprocating motion at a rate equal to the unit time value of the notes to be played, and such a reciprocating member has been the medium by which the notes played have been recorded in units of time value. Such a proceeding has been disadvantageous, because it has been necessary to translate such a record of units and to convert them into collective time values and arrange them in proper musical notation.

According to my present invention I still employ a reciprocating member or carriage reciprocating at a rate equal to the units of time value of the notes being played—that is, for instance, if in common time the shortest time value of a note was a sixteenth then the carriage would perform sixteen reciprocations for each bar. I employ such a carriage, in combination with the mechanism or groups of mechanism hereinafter described, in such manner that the collective time values of the notes played are first resolved into uniform component fractions, (or what I have called "units of musical time value,") the mechanism then effecting a subsequent contraction of the units into their original collective time values and the expression of the resultants by the usual distinctive symbols representing synchronously a note and a time value—that is, into the ordinary musical notation in common use.

In order that my invention may be understood, I will describe the same with reference to the accompanying drawings.

Fig. 2 is a side view, Fig. 12 is a horizontal section of the same. The means by which C♭ or B♯ is recorded or F♭ or E♯ is recorded are described with reference to Fig. 13, which shows a detail front sectional elevation of a shifting mechanism for governing the position of adjustable pinion-wheels, Fig. 14 being a similar view in another position.

Similar numerals of reference refer to like parts in the various figures of the drawings.

Carried in a suitable framing or casing 1 I provide a reciprocating carriage 2, composed of a rectangular block or frame extending between the two end frames 1 of the case and having on its rear face projecting tappet-ribs 3, which extend the whole length of the carriage 2. This carriage 2 is supported by links 4, one of which is shown in dotted lines in Fig. 1, the said links being pivoted at 5 to stationary fulcrums and at their upper ends taking over trunnions on the carriage 2.

Figure 1:
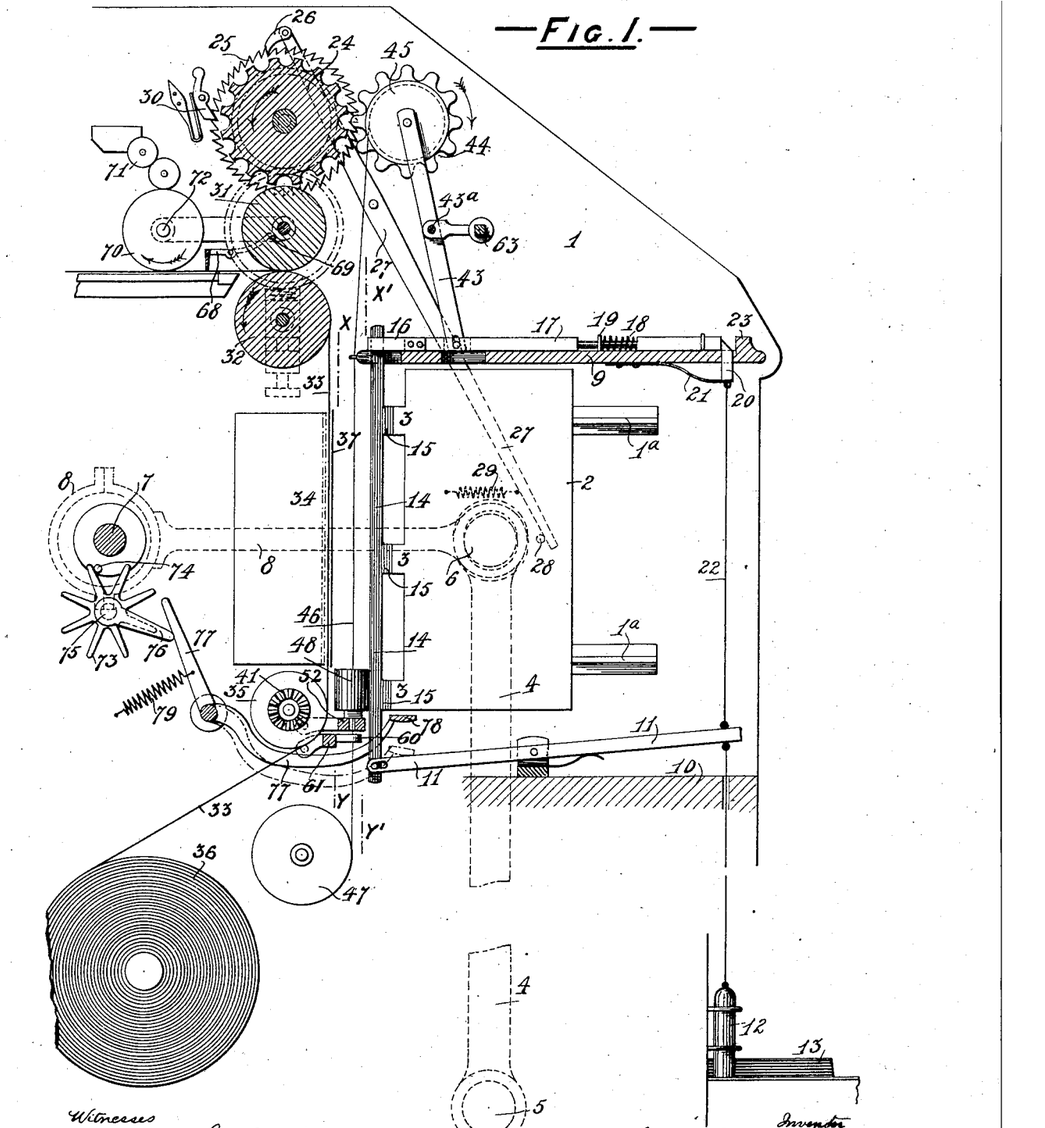
Figure 1 is a transverse sectional elevation through my improved machine for recording music, illustrating the general arrangement of the parts.

7 is a shaft extending the length of the recording instrument, carried in bearings on the end frames 1 thereof and rotated by an electric or other motor. This shaft carries eccentrics, one of which is indicated by dotted lines and marked 8, and the eccentric-rods therefrom extend and take onto the trunnions on the carriage 2, so that the carriage by the rotation of the shaft 7 is reciprocated with but little friction and practically no noise.

The carriage 2 is to have a rectilinear reciprocating motion, and therefore it should be suitably guided in its travel. For instance, the ends of the carriage may be formed with grooves, which engage ribs 1ª, fixed to the end frames 1 of the case, and a slight play may be provided in the bearings between the links 4 and the trunnions 6, as indicated in dotted lines, Fig. 1. The pulsations of this carriage are timed that they "beat," so to speak, with the music, and the motions of the part 2 continue throughout the recording operations.

Between the end frames 1 of the apparatus there extend horizontal tables 9 and 10, and upon the table 10 there are pivoted a number of levers 11, one for every key of the musical instrument. The front ends of the levers 11 are caused to follow the motions of the keys—that is, when, for instance, a natural key of the instrument is depressed the front end of the lever 11 is pulled down, and this may be effected by any suitable means; but I have shown diagrammatically a weight 12, resting upon a key 13 of the musical instrument, which key when depressed would allow of the descent of the weight 12, and the front end of the lever 11 would be lowered. It is, in fact, essential to the operation of the mechanism that the key and the lever 11 should be so connected that they move together. The opposite end of this lever 11 engages by a pin and slot with a tappet-bar 14, which extends up the rear face of the carriage 2 and has projecting parts 15, which in the position shown in the drawings engage with tappet-ribs 3 of the carriage. The upper ends of the tappet-bars 14 pass through comb-like guides formed on the edge of the upper table 9. The upper ends of the tappet-bars 14, which project above the table 9, pass through slots 16, formed in the ends of horizontally-located plunger-bars 17, and these plungers 17 carry and slide upon the table 9, this being illustrated at Fig. 5 on a larger scale. The plunger 17 is pressed forward by a spring 18, is guided by guides 19, and is normally prevented from moving forward by means of a sliding bolt 20. This bolt 20 is held in the position shown at Fig. 1 by a spring 21, the bolt being controlled by a flexible connection 22, which extends to the front end of the lever 11. With this arrangement of mechanism when a key of the pianoforte is depressed the lever 11 will be drawn down, the tappet-bar 14 will be moved up until its projections 15 do not come against the tappet-ribs 3, but lie between them, the bolt 20 will be withdrawn, and the plunger 17 will slide forwardly until it is brought to rest by the stationary stop 23 drawing forward with it the top end of the bar 14 and moving it out of the path of the ascending shuttle 48, as hereinafter described.

Mounted between the end frames 1 of the device and extending the whole length of the apparatus is a roller 24, fitted on its end with a ratchet-wheel 25 and given a step-by-step rotation in accord with the motions of the carriage 2 by, for instance, a pawl 26, carried by a pivoted lever 27, the lower end of which is operated by a pin 28 on the carriage against the action of a spring 29. (Indicated by dotted lines.) 30 is a retaining-pawl. This roller 24 is grooved throughout its length into the form of teeth and at one end is geared to a roller 31, which roller 31 bears against and may be geared to a roller 32, and between these rollers 31 and 32 the paper passes upon which the record has been printed, the said paper 33 passing upward in the front of a stationary type-holder 34, hereinafter described, being drawn over a roller 35 from off a paper-reel 36. Thus the roller 24, the paper-carrying rollers 31 32 35, and the paper 33 all receive a step-by-step motion in time with the pulsations of the carriage 2.

In front of the paper strip 33 is an inking-ribbon 37, (clearly shown at Fig. 4,) and since it is necessary to traverse this inking-ribbon, as is the common practice in type-writing machines which employ inking-ribbons, the ribbon 37 is carried by one of its ends being fixed to a spring-operated roller 38, while its other end is wound around a roller 39, the shaft of which carries a bevel-wheel 40, gearing with a bevel-wheel 41 on the spindle of the paper-guide roller 35, (shown at Fig. 1,) and thus the inking-ribbon is traversed with a step-by-step motion. At Fig. 1 the inking-ribbon is shown by a black line, the rollers which carry it being removed to simplify the drawing.

Figure 2:
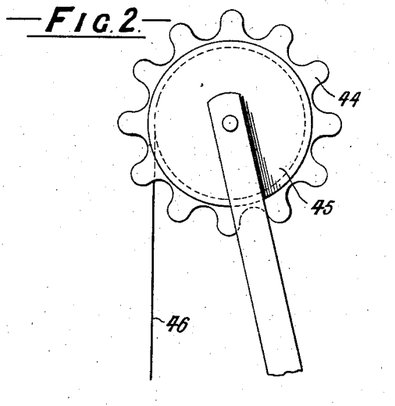
Figure 3:
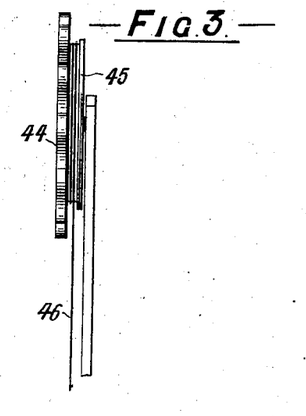
Fig. 3 is a front elevation, of a pinion-wheel detached and drawn to a larger scale than the previous figure.
Figures 4, 5, 6:
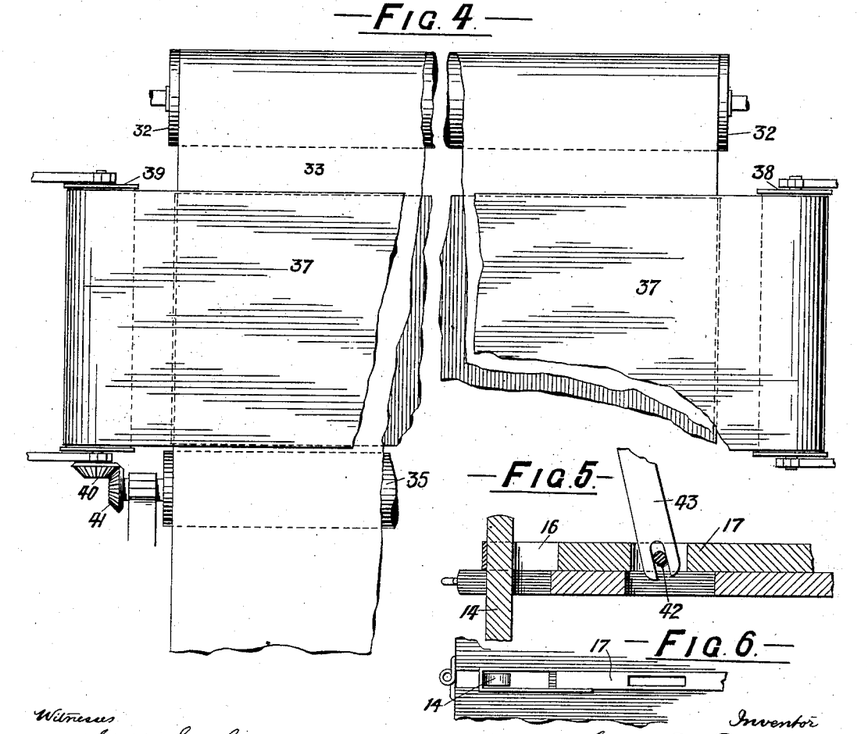
Fig. 4 is a longitudinal vertical section taken about the line X Y of Fig. 1 looking to the left, showing the inking-ribbon and paper strip appertaining to the printing mechanism of the machine.
Fig. 5 is a transverse sectional elevation of a part of the mechanism shown at Fig. 1, but drawn to a larger scale.
Fig. 6 is a part plan view of the parts shown at Fig. 5.

A pin 42, Fig. 5, carried by the plunger 17, engages a fork in the end of a lever 43, pivoted on a spindle 43ª, extending the length of the machine, there being one such lever for every key of the instrument, and the opposite end of the lever 43 carries a pinwheel 44, which is adapted to engage with the teeth upon the roller 24, while upon the side of the pinwheel there is formed a drum 45 to receive a flexible cord, as will be clearly seen in the detailed views of this part at Figs. 2 and 3. The cord 46, which depends from each of the drums 45, is non-elastic, and one of its ends is fixed to the said drum 45, while its other end is wound around and fixed to spring-disks 47, Fig. 1, so that the non-elastic cords 46 are always held stretched.

The device just described is brought into action when the bolt 20 is withdrawn and allows the plunger 17 to move forwardly. This action rocks the lever 43 and throws the pinwheel 44 into gear with the toothed roller 24, and the wheel 44 then shares the step-by-step movement, which draws up the cord 46 against the action of its spring-disk 47 with a step-by-step motion until the pinwheel 44 is again thrown out of gear.

I have before explained that when a key is depressed the lever 11 is operated to raise the tappet-bar 14, bringing its projections 15 out of range of the tappet-ribs 3 of the carriage 2, while the bolt 20 is simultaneously withdrawn and allows the plunger 17 to slide forward and bring the pinwheel 44 into engagement with the teeth of the roller 24. In its forward movement the plunger 17 carries with it the upper end of the tappet-bar 14, which bar 14 is free to move vertically within the slot 16 in the plunger 17, as aforesaid. As soon as a key of the instrument is released the lever 11 immediately rises, pulling down the tappet-bar 14, while the bolt 20 is free to rise. As soon as the projections 15 of the tappet-bar 14 come in front of the tappet-ribs 3 of the carriage 2 the tappet-bar 14 is forced back to effect the printing operation, which I will hereinafter describe, while at the same time the plunger 17 is drawn back by the tappet-bar 14, bringing the pinwheel 44 out of engagement with the roller 24 and allowing the bolt 20 to jump up in front of the forward end of the plunger 17 and retain it in the position shown at Fig. 1.

On those cords 46 which are attached to the drums 45, operated by the white or natural keys of the instrument, there are pierced cylinders, through which the cords pass and which are free to easily slide up and down the particular cords upon which they are strung. These cylindrical pieces 48 are clearly shown at Figs. 1 and 7, and the office of them is to be brought in between the tappet-bar 14 and the type carried by the type-block 34 and to act against the inking-ribbon 37 for printing off the record.

Upon the cord 46 and below the cylindrical part 48 (which I will hereinafter term the "shuttle") there is fixed a bead 49, which prevents the cord slipping through the shuttle when the bead comes in contact with the latter. Upon the intermediate cords 50, which are connected with the black keys of the instrument, there are fixed beads 51, which normally rest upon a frame or bar 52, and upon these beads 51 the shuttles 48 normally rest. The bar 52 is capable of being slid longitudinally, and its end passes through the end of the casing 1 and is fitted with an adjusting-screw 53, (see also Fig. 8,) by which it may be slid. The cords 50, carrying the beads 51, pass through holes in the frame 52, while the cords 46 pass through slots in the frame 52, so that by shifting the frame 52 endwise, as described, by means of the adjustment-screw 53 the beads 51 may be caused to come below either a right-hand or a left-hand shuttle 48, as the case may be, in order to record either flats or sharps.

Figures 10, 11:
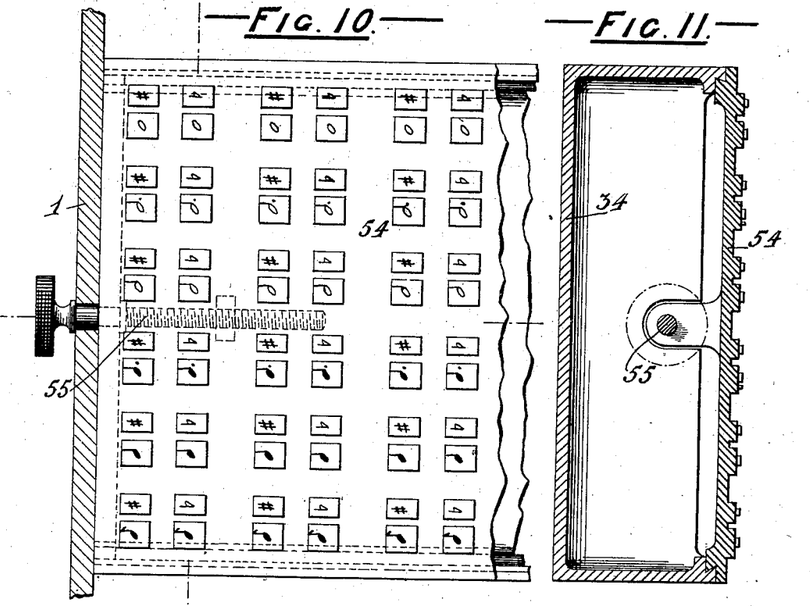
Fig. 10 is a longitudinal front elevation of a portion of the type-plate and its carrying-frame and illustrating the means by which the said plate is adjusted.
Fig. 11 is a transverse section of the type-plate and carrier shown at Fig. 10.
Figure 12:
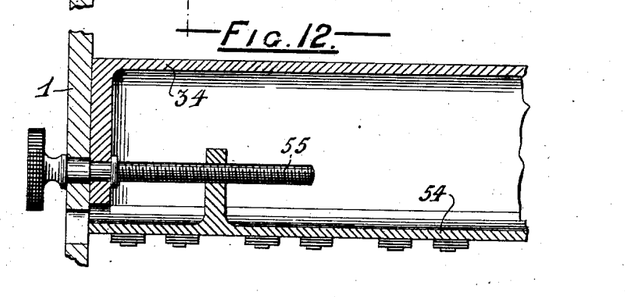

Behind the inking-band 36 and paper 33 is located the type-holder 34. This type-holder is shown in some detail at Figs. 10, 11, and 12, and consists of a stationary frame 34, extending longitudinally across the machine.

Mounted in longitudinal guides upon the front face of the frame 34 is a type-plate 54, which can be slid longitudinally in the guides by an adjustment-screw 55, extending through the end of the machine. Upon the front face the type is formed in vertical rows presenting one or more series of graded notes—for instance, as sharps and flats; but only one series is in use at one and the same time, the others being out of action, because they are not directly behind the shuttles 48. A number of type-plates may be provided to be substituted one for the other, so as to be able to always present the types most suitable for the particular key in which it is desired to record to avoid printing the sharps or other signs other than as real accidentals, the proper signature being filled into the record by hand afterward.

Figures 7, 8, 9:
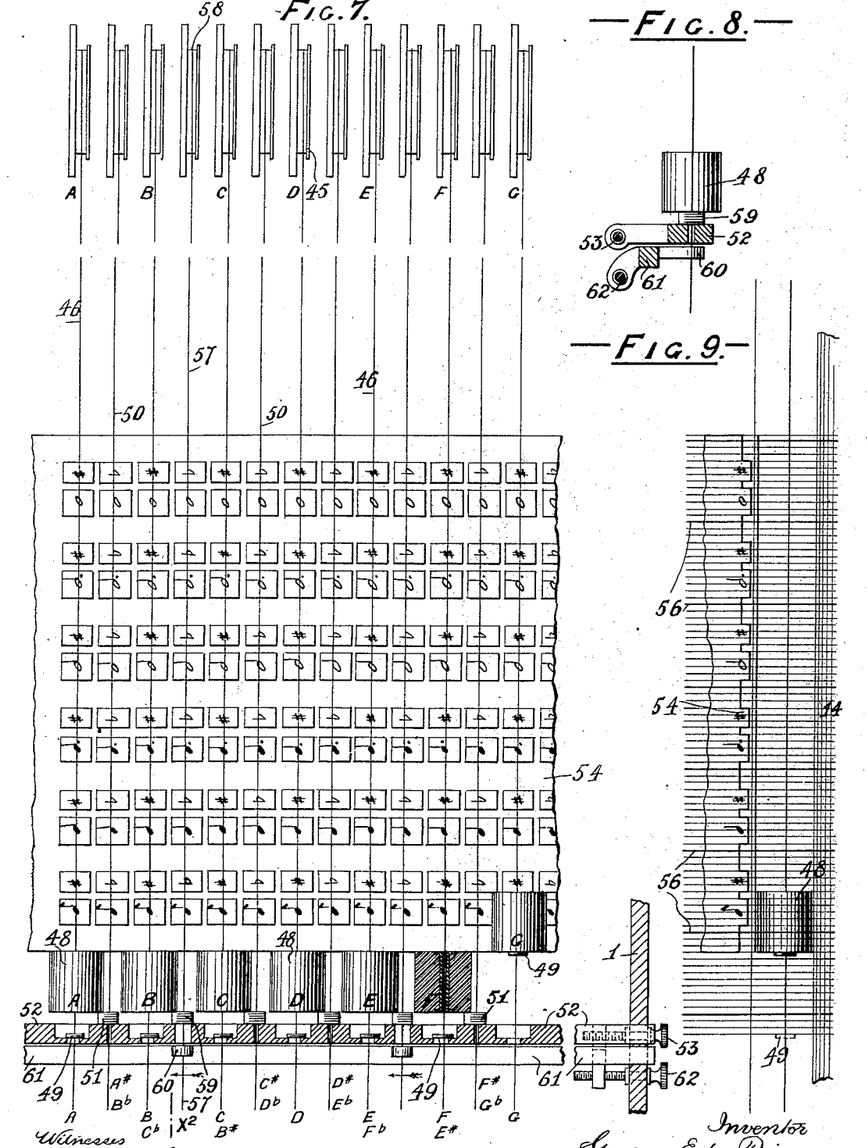
Fig. 7 is a longitudinal sectional elevation taken about the line X' Y', Fig. 1, (the paper and inking-ribbon being removed,) and shows an octave of movable printing-shuttles (hereinafter described) which are to be employed for pressing the paper to be printed against the type, which is normally stationary.
Fig. 8 is a transverse section of the lower part of Fig. 7, taken about the line $X^2$ looking to the right.
Fig. 9 is a diagram in explanation of the motion of one of these shuttles.

In recording the notes produced by the white keys of the instrument—that is, playing in a natural key—the cord 46, Fig. 7, given motion to in concordance with the instrument-key operated, is drawn up by its roller 45 and the fixed bead 49 is brought up. At Fig. 9 I have given a diagram which illustrates this motion, the horizontal black lines 56 showing the total lift of the shuttle 48 at each step of the motion and the actual position of the shuttle when printing a note and an accidental—that is, as operated by a black key. Each of these steps has been divided into twelve parts by thin lines, indicating twelve thirty-seconds of an inch equals three-eighths of an inch. In this diagram the shuttle 48 is shown as being nine thirty-seconds of an inch long, (equal to nine divisions,) and in the first step of its motion it will move through nine divisions only, the first three divisions of the twelve having been lost in bringing the bead 49 up against the shuttle 48, in the second step the shuttle 48 would move through the entire twelve divisions, and so on. The first four thirty-seconds of an inch of the type-strip shown at Fig. 7 is a sunken surface, the next four thirty-seconds of an inch is raised and carries a note of the smallest value which is to be recorded, then one thirty-second of an inch is sunken and the next three thirty-seconds of an inch is a raised surface carrying an accidental, in this case a ♯, then follow four thirty-seconds of an inch of sunken surface, and so on. The original position of the button 49 is shown by dotted lines. It will now be seen that upon the pin-wheel 44 being thrown into gear the first step motion of the mechanism will bring up the shuttle 48 until it occupies the position shown at Fig. 9, and the next rearward advance of the tappet-bar 14 will cause the shuttle 48 to be pressed against the inking-ribbon 37, which will press the paper between the type and itself and print off upon the paper that particular note. Supposing that the key of the pianoforte is still held down, the tappet-bar 14 would not be acted upon, and consequently instead of printing that first note the shuttle 48 would lift another step of twelve thirty-seconds of an inch, which would bring the upper end of the shuttle 48 just above the second note on the type-plate 54, while the lower end of the shuttle is just clear of the lower accidental type, and consequently if the pianoforte-key is released the tappet-bar 14 will press the shuttle 48 against the second type and print that note upon the paper strip. It will now be understood that so long as a key of the instrument is held down—that is, so long as a note is continued—the shuttle 48 will continue its upward movement, passing the type indicating the quaver, the dotted quaver, the crotchet, the dotted crotchet, &c., and the printing will take place when the key of the instrument is released—that is, when the note is discontinued. This release of the instrument-key brings down the tappet-bar 14 into the position shown at Fig. 1, disengages the wheel 44 from the toothed roller 24, and the rearward movement of the carriage 2 presses the shuttle 48 against the inking-ribbon 37 and prints off the note on the traveling band 33. While this is proceeding the spring-disks 47 wind the cord 46 and bring down the bead 49 to its resting-place, and immediately the shuttle is released from the pressure of the tappet-bar 14 it slides down the cord 46 to its rest position until again brought into use. The rearward printing movement of the tappet-bar 14, carrying with it the plunger 17, enables the bolt 20 to come in front of the end of the plunger and the parts assume their inoperative positions. (Shown at Fig. 1.) The paper strip upon which the notes have been recorded passes, as before explained, in between the gripping-rollers 31 and 32, and it is immediately after its passage between these rollers that the bars are indicated and the staff printed, as will be hereinafter described.

Figure 16:
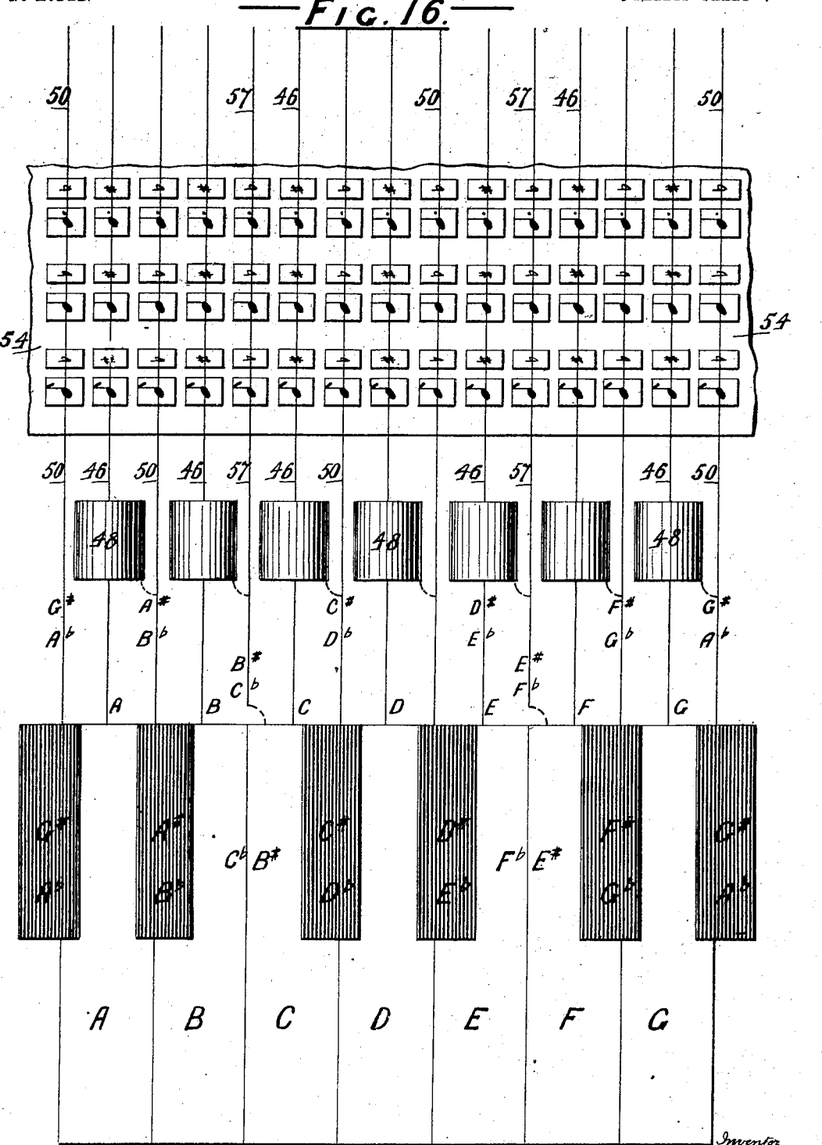
Fig. 16 is a diagram indicating a portion of the keyboard of a pianoforte and the printing-shuttles in order to explain their relation.

It has now been explained that when the white keys are struck the natural notes are printed on the paper strip in the usual signs giving the proper time values. When the black keys are to be played, then the notes must be recorded as either sharp or flat, and to effect this the type-plate 54 must be first adjusted by the screw 55, Fig. 10, until the required series of notes come behind the shuttle 48. Referring to the diagram Fig. 16, it will be observed that if the black key to the right of A is operated and A♯ is to be recorded then the bead 51 of the cord 50, Fig. 7, which will be drawn up, should be below that shuttle 48 in connection with key A. Therefore the slide-bar 52 should be adjusted by its screw 53 toward the left into the position shown at Fig. 7, and this will bring all the beads 51 of the black keys beneath the left-hand shuttle. Now when a black key is depressed its wheel 45 will be brought into action, its bead 51 will be raised with the step-by-step motion, and the shuttle 48 beneath which it is located will be carried upward, and when that black key is released its wheel 45 will be thrown out of action, the cord 50 will be drawn down by the spring-disk 47, the bead 51 will again rest upon the bar 52, and the shuttle 48 will have descended its cord 46 and again rest upon the bead 51, as shown at Fig. 7. Therefore, referring to the diagram Fig. 16, it will be seen that in order to cause all the black keys to print notes and sharps in the proper positions the type-plate 54 must be so placed that all the notes behind the cords 46 are notes with a sharp sign, while all the beads 51 upon the cords 50 of the black keys must be beneath those shuttles to the left, as indicated by the dotted arcs in diagram 16. Now in the pianoforte-keyboard there are but five black keys to seven white keys in each octave, while there are scales of seven sharps or seven flats. Therefore, referring to diagram Fig. 16, when the key C is operated in playing C♯ major the note requiring to be recorded on the music-sheet is B♯, and, similarly, when the key F is struck E♯ is required to be recorded. Obversely, when playing in seven flats, (C♭ major,) when the key B is struck C♭ should be recorded, and when E is struck F♭ should be recorded. To do this, I introduce two extra elements into each octave to create symmetry to enable me to produce records in all the scales, and I may arbitrarily when writing in C♯ dispense with C♮ and with F♮, because these notes mostly occur in the key of C♯ only in the enharmonic form—that is to say, as B♯ and E♯. In arranging the mechanism, therefore, to this end I provide similar auxiliary mechanisms between the mechanical elements of B and C and E and F, and therefore it will be sufficient for this specification to describe the auxiliary elements introduced between B and C.

Figure 13:
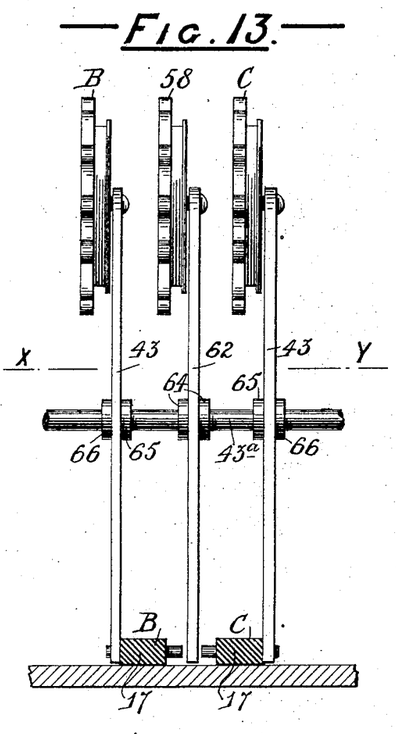
Figure 14:
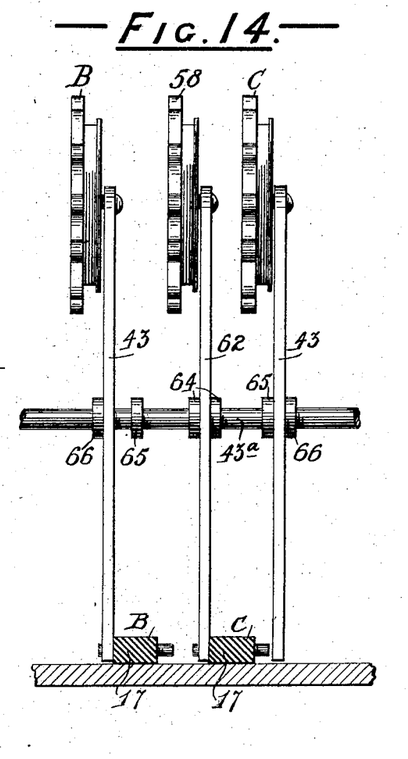
Figure 15:
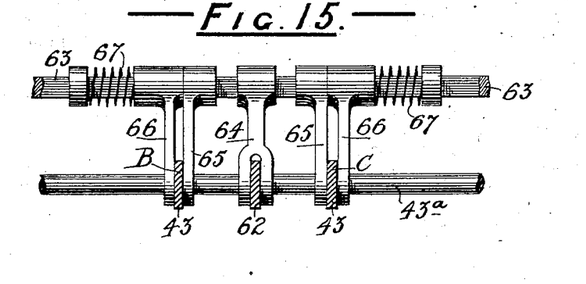
Fig. 15 is a sectional plan view of the shifting mechanism, taken on the line X Y of Fig. 13.

Referring to Fig. 7, 57 is a cord carried upon a wheel 58, the cord having a bead 59, resting normally upon the bar 52, there being a slot in the bar through which the cord 57 passes. After passing through the bar 52 the cord 57 passes through a lug 60 upon a slide-bar 61, which latter is adjustable longitudinally by an adjustment-screw 62, all as shown at Fig. 7, while the slide-bars are also shown in transverse section at Fig. 8. The drawing Fig. 7 shows the slide-bar 61 adjusted in position so that when the natural key C is struck B♯ shall be printed, and consequently the bead 59 has been moved by the adjustment of the bar 61 to beneath the shuttle 48, which prints the note B♯. When, therefore, the note C♮ is struck as B♯, it is necessary that the cord 57 should be drawn up by the revolution of the wheel 58, and in order to effect this I construct the mechanism as shown at Figs. 13, 14, and 15—that is to say, the wheel 58 is carried on an arm 62, located between the arms of the B and C♮ wheels, the arm 62 being mounted so as to be movable laterally upon the spindle 43ª, and the lower end of the arm 43 is not normally connected to a plunger, as are the other similar arms 43, but is formed at its lower end with a fork, which when the arm 62 is moved laterally one way or the other (see Fig. 13) is caused to engage with a pin projecting from either the B or C plunger. At Fig. 14 the arm 62 is shown as engaged with the C plunger in this way. In this part of the mechanism the arms 43 which carry the B and C wheels are also made capable of lateral motion on the spindle 43ª, so that by relatively moving the arm 62 and the arms of the B and C wheels I can, for example, when playing C cause the wheel 58 to be connected to the plunger C and throw the C wheel and its arm 43 entirely out of action—that is, into the position shown at Fig. 14—and, again, when playing the key B and requiring to record C♭ I can connect the arm 62 of the wheel 58 to the B plunger and throw the B wheel and its arm out of action by disengaging its said arm from the plunger B, while when playing B or C and not requiring to record B♯ or C♭ the wheel 58 and its arm 62 are disconnected from both the C and B plungers, as shown at Fig. 13. To effect this motion, I provide a rod 63, extending from end to end of the machine and capable of endwise adjustment, and upon this rod I fix a forked finger 64, bifurcations of which extend upon either side of the arm 62 upon the spindle 43ª. 65 65 are fingers fixed upon the rod 63, extending against the sides of the B and C arms 43, adjacent to the arm 62, while upon the outer sides of the B and C arms 43 there are fingers 66, the bosses of which are carried by and can slide upon the rod 63, being held up against the bosses of the fingers 65 by springs 67, acting against collars on the rod 63. By this arrangement when the rod 63 is traversed in one direction the arm 62 will be moved toward the C plunger 17 until its lower end engages the projecting pin thereon, the C arm 43 will be carried away from the C plunger and out of engagement therewith, while the B arm 43 will retain its position by the sliding finger 66 moving upon the rod 63 against the action of the spring 67. Thus when playing the key C♮ and requiring to record B♯ (in C♯ major) the bead 59 must be located under the B shuttle 48 and the wheel 58 connected to the C plunger 17 while the C wheel 45 is out of action. When playing the key B♮ and requiring to record C♭, the bead 59 must be under the C shuttle 48 and the wheel 58 connected to the B plunger 17 while the B wheel is out of action. When playing B♮ or C♮ and not requiring to record B♯ or C♭, then the wheel 58 is disconnected from both B and C plungers. Precisely the same mechanisms and operation occur with respect to the accidentals between the keys E and F, as will be understood from the foregoing description.

The bars are formed by an arm 68, Fig. 1, mounted upon a pivot, the tail of this pivoted arm being operated upon by a pin 69 at the end of the roller 31, which depresses the perforating-blade of the arm 68 and causes the paper to be perforated. Obviously an ink printing device similarly operated may be provided, if desired. The bar is thus marked upon the paper once in every revolution of the roller 31, and this will occur after a regular number of the step-by-step motions have been performed by the roller 24, and consequently after a regular number of reciprocations have been performed by the carriage 2. If instead of one pin 69 two such were to be fitted in the end of the roller 31, then a bar would be indicated at half the lapse of time which it would with one pin, and so it will be seen that the time of operation of the bar-marking device must be regulated according to the time of the music which is being performed.

70 indicates a number of printing-disks to print the staff-lines and extra staff-lines as the paper travels beneath them, and these disks are supplied with ink by any suitable ink-supply rollers 71 and are connected by outside pulley-wheels with the roller 32. The pulley-cords are crossed in order to cause the disks 70 and the roller 32 to revolve in opposite directions, so that the record-strip may be passed out of the machine. The printing-disks are arranged upon a spindle 72 and should be so fitted that their positions can be adjusted in the direction of the axis of the said spindle 72, and so that by suitably adjusting the disks 70, which print the staff-lines, the music played upon the keyboard of the instrument can be transposed.

It is necessary that any sustained notes which are held down for a longer period than one bar should be printed in the first bar and printed again in the second bar—that is to say, at the completion of the number of pulsations of the device which represent one bar of the music the continued notes must all be printed—and to this end I provide a device which at the end of each bar shall bring down the tappet-bars 14, and thereby cause the printing of all the continued notes, the said tappet-bars 14 being immediately released. This mechanism, as indicated in the drawings at Fig. 1, consists of a star-wheel 73, having the requisite number of arms, which are acted on consecutively by a pin 74, carried by the shaft 7. The spindle 75 of the star-wheel 73 carries a suitable number of arms 76, one such being shown in the drawings, and the said arm or arms in their rotation act upon one arm of a bell-cranked lever 77, the other arm of that lever carrying a longitudinal bar 78, which is normally held in the position shown in the drawings—that is, its inoperative position—by a suitable spring 79. In the example shown the star-wheel 73 will complete a revolution at the eighth pulsation of the carriage 2; but if the star-wheel had sixteen arms it would complete a revolution at the sixteenth pulsation, and a series of interchangeable star-wheels should be provided. When the arm 76 has completed a revolution which is timed to be at the end of a bar—that is, at the completion of a number of notes whose collective time value compose a bar—then the longitudinal bar 78 descends, presses down all those levers 11 which are held up by a sustained note, and causes that note to be printed at the end of the bar, the levers 11 being immediately again released by the uprising of the longitudinal bar 78, which descends again at the end of the next bar, and so on.

What I claim as my invention, and desire to secure by Letters Patent, is—

1. In a machine for recording upon a paper strip in ordinary musical notation the notes and time values played on a pianoforte or the like, the combination of a normally stationary vertical type-plate, vertically-arranged series of type-notes increasing in time value upward on the face of the type-plate, mechanism to give the aforesaid paper strip a step-by-step traverse over the face of the type-plate in time with the shortest note played, a tappet-bar 14 at a distance in front of the type-plate, a printing-shuttle 48 located in a plane passing between the paper strip and the bar 14, mechanism for carrying the printing-shuttle upward between the bar 14 and the paper strip with a step-by-step motion in time with the movements of the strip over the type-notes of increasing values during the depression of the instrument-key, and mechanism to advance the bar 14 upon the release of the instrument-key to press the printing-shuttle onto the paper strip to print that record-note which lies behind the shuttle at the time, and mechanism to return the shuttle to its original position at the base of the type-plate, substantially as set forth.

2. In a machine for recording upon a paper strip in ordinary musical notation the notes and time values played on a pianoforte or the like, the combination with a normally stationary vertical type-plate, vertically-arranged series of type-notes increasing in time value upward on the face of the type-plate for each natural key of the instrument, means for giving the paper strip upon which the record is to be printed a step-by-step traverse over the face of the type-plate, a tappet-bar 14 in front of the type-plate, and mechanism to advance the bar 14 toward the type when the instrument-key is released, a pulley-wheel, and means for giving the wheel step-by-step motions in time with the paper during the depression of the instrument-key, and of releasing the pulley-wheel upon the release of the key, of a cord 46, fixed at one end to and normally wound upon the pulley-wheel and passing between the bar 14 and the paper strip, and a spring winding device to which the lower end of the cord is fixed below the type-plate to draw the cord downward when the pulley-wheel is released, a bead 49 fixed on the cord and a longitudinal bar 52 on which the bead normally rests and a slot in the bar 52 through which the cord 46 passes, a printing-shuttle 48 loose on the cord and normally resting on the bead by which the printing-shuttle is carried up between the bar 14 and the paper strip for printing, when the key is released, substantially as described.

3. In a machine for recording upon a paper strip in ordinary musical notation the notes and time values played on a pianoforte or the like, the combination with a carriage, tappet projections 3 on the rear face of the carriage, means for giving the carriage continuous horizontal reciprocations, a motor-roller 24 above the carriage, a normally stationary type-plate in the rear of the carriage, means for giving uniform step-by-step traverse motions to the paper strip located in front of the type-plate and a similar step-by-step rotative motion to the roller 24 from and in accord with the motion of the carriage, of a group of mechanism for each natural key of the instrument, consisting of a tappet-bar 14 having tappet projections 15 to coact with the projections 3 of the carriage and located normally opposite same, a pivoted lever 11 to carry the tappet-bar, a horizontally-sliding plunger 17 above the carriage, means for carrying the plunger from the framework of the machine, a slot in the plunger 17 to receive the end of the tappet-bar so that the plunger is drawn rearward when the bar 14 is moved rearward by the tappets 3 of the carriage, a spring to bring the plunger 17 forward and a bolt to normally hold the plunger in its rearward position, a fixed pivot 43$^a$ above the plunger, a lever 43 on the pivot, a pin on the plunger engaging the lower end of the lever 43, and a pulley-wheel on the other end of the lever adapted to engage with and be rotated by the motor-roller when the plunger is allowed to move forward, a cord 46 fixed to the pulley-wheel and passing between the bar 14 and the paper strip, a spring tension below the tappet-bar to draw the cord taut, a bead fixed on the cord, and a bar 52 below the type-plate on which the bead rests, a cylindrical printing-shuttle loose on the cord and normally resting on the bead, mechanism brought into action by the key of the instrument to raise the tappet-bar 14 out of engagement with the tappets of the carriage, a release mechanism operated by the key of the instrument to release the plunger 17, a spring 18 to carry the plunger forwardly to bring the pulley-wheel 45 into engagement with the motor-roller 24 to draw up the shuttle 48 by a step-by-step movement between the tappet-bar 14 and the paper strip, a stationary table over which the paper strip passes after leaving the type-plate, a bar-marking device operated from the roller 24 to record the bar-division on the record-strip, and a series of printing-disks to print staff-lines as the paper strip travels along, substantially as set forth.

4. In a machine for recording upon a paper strip in ordinary musical notation the notes and time values played on a pianoforte or the like, the combination of a carriage having tappet projections on its rear face, mechanism for giving the carriage uniform rectilinear reciprocations in time with the shortest note played, a tappet-bar in the rear of the carriage for each natural key of the instrument, and tappet projections on the front face of the tappet-bar normally opposite to the tappet projections of the carriage, a horizontally-sliding plunger, a slot in the rear end of the plunger in which the upper end of the tappet-bar engages, a spring to carry the plunger forward when released, a lever pivoted upon a fixed pivot carried by the framework, a pivot connecting the lower end of the lever to the plunger, a pulley-wheel carried upon the upper end of the said lever, a cord connected to the pulley extending downward between the bar 14 and the paper strip, and parallel with and in the rear of the tappet-bar, and a spring tension below the tappet-bar to draw the cord taut, a bead fixed on the cord and a cylindrical printing-shuttle above the bead, carried and free to slide upon the cord, and a rest to support the bead, and means for giving the paper strip for receiving the record step-by-step traverse motions in one direction in time with the reciprocations of the carriage, a printing device at the rear of the paper strip having vertically-arranged series of type-notes increasing in time value upward, a toothed roller carried in bearings on the framework, and means for communicating step-by-step rotative movements to the roller in time with the reciprocations of the carriage and the paper, mechanism operated by the depression of the instrument-key for lifting the tappet-bar out of engagement with the tappets of the carriage, means for releasing the sliding plunger whereby the pivoted lever is rocked and the pulley-wheel is brought into engagement with the toothed roller to draw up its cord and lift the shuttle with step-by-step motions up the rear face of the tappet-bar to cause it to travel up the series of tappet-notes, and means, when the instrument-key is released, for bringing down the tappet-bar so that it receives a thrust of the carriage to force the shuttle against the paper and print the note thereon which is behind it, while the sliding plunger is carried rearward by the end of the tappet-bar, the pulley-wheel is drawn out of action by the slide of the plunger, the cord is drawn down, the shuttle descends, and the plunger is locked in its rearward position, substantially as set forth.

5. In a machine for recording upon a paper strip in ordinary musical notation the notes and time values played on a pianoforte or the like, the combination with a normally stationary vertical type-plate, vertically-arranged series of notes increasing in time value upward on the face of the type-plate, mechanism to give the paper strip a step-by-step traverse over the face of the type-plate in time with the shortest note played, a printing-shuttle 48 for every natural key of the instrument, located in a line with each series of notes on the type-plate, and a guide for the shuttle located in front of the paper strip, means for adjusting the type-plate to bring a series of notes with either sharp or flat signs to coact with the printing-shuttle, mechanism to carry the printing-shuttle upward in front of the paper strip when a natural key is played, and a tappet-bar 14 in front of the shuttle when raised to act on the latter and record a natural note on the strip when a white key of the instrument is released, a group of mechanism for every black key of the instrument, consisting of a cord 50 passing in front of the paper strip and a bead 51 fixed on the cord below the bases of the printing-shuttles 48, means for laterally shifting the bead to beneath either adjacent shuttle, means for raising the bead and carrying the shuttle 48 beneath which it lies upward with a step-by-step motion between the paper strip and the tappet-bar 14 during the depression of the black key of the instrument, and mechanism to stop the motion of the bead 51 and shuttle 48, and means also to advance the tappet-bar 14 and press the shuttle onto the type to record the note and either the sharp or flat which is behind the shuttle, upon the instrument-key being raised, substantially as set forth.

6. In a machine for recording upon a paper strip in ordinary musical notation the notes and time values played on a pianoforte or the like, the combination with a normally stationary vertical type-plate, vertically-arranged series of notes increasing in time value upward on the face of the type-plate, mechanism to give the paper strip a step-by-step traverse over the face of the type-plate in time with the shortest note played, a printing-shuttle for every natural key of the instrument, located in a line with each vertical series of notes on the type-plate, and a guide for the shuttle located in front of the paper strip, means for adjusting the type-plate to bring a series of notes with either sharp or flat signs to coact with the printing-shuttle, mechanism to carry the printing-shuttle upward in front of the paper strip when a natural key is played, and a tappet-bar 14 to act on the shuttle and record a natural note on the strip when a white key of the instrument is released, of mechanisms whereby when the instrument-key C is played the note B♯ may be recorded, or when the key B is played C♭ may be recorded, and similarly with the keys E and F, each consisting of a cord 57, a bead 59 fixed upon the cord, a longitudinally-movable slide 61 through which the cord passes, and by which it can be shifted to bring the bead 59 beneath either one or other of the adjacent shuttles 48, a pulley-wheel 58 for the cord 57, and a shifting mechanism by which the pulley-wheel 58 can be connected to and actuated by the mechanism of the C key of the instrument to record B♭ while the pulley-wheel connected with the C♮ is thrown out of action, and vice versa with reference to the B key of the instrument, substantially as described.

7. In a machine for recording upon a paper strip in ordinary musical notation the notes and time values played on a pianoforte or the like, the combination with a normally stationary vertical type-plate, vertically-arranged series of type-notes increasing in time value upward on the face of the type-plate, means for giving the paper strip a step-by-step traverse over the face of the type-plate, a tappet-bar 14 in front of the type-plate, tappet projections on the front of the bar, a reciprocating carriage 2 and tappet projections on the carriage to coact with those on the bar 14, a lever 11 to carry the bar, and means whereby the lever is operated upon the depression of the instrument-key to raise the tappet-bar out of the range of the carriage and to bring the bar within the range of the carriage upon the release of the instrument-key, a printing-shuttle 48 located in a plane passing between the paper strip and the bar 14, mechanism for carrying the printing-shuttle upward between the bar 14 and the paper strip with a step-by-step motion in time with the movements of the strip over the type-notes of increasing values during the depression of the instrument-key to print a record of the note which lies behind it on the type-plate when the bar 14 is brought into action by the release of the instrument-key, of means for bringing all the type-bars down within the range of the reciprocating carriage 2 at the end of each bar in order to print off the record of those notes which are prolonged beyond the length of one bar and to again release the bars 14 consisting of a bar 78 and mechanism for lowering the bar 78 to bring down the tappet-bars, and immediately releasing the bar 78 and returning it to its normal position, consisting of pivoted levers 77 carrying the bar 78, and an extension of the pivoted levers 77, and a tappet-wheel to operate the lever 77, and means for actuating the tappet-wheel from the motor mechanism of the reciprocating carriage 2, substantially as set forth.

GEORGE EDE PRINCE.

Witnesses:
T. W. ROGERS,
W. A. MARSHALL.